United States Patent [19]
Brown

[11] Patent Number: 4,577,928
[45] Date of Patent: Mar. 25, 1986

[54] CRT MAGNIFYING LENS ATTACHMENT AND GLARE REDUCTION SYSTEM

[75] Inventor: Eugene C. Brown, Birmingham, Mich.

[73] Assignee: Data Vu Company, Birmingham, Mich.

[21] Appl. No.: 751,180

[22] Filed: Jul. 2, 1985

Related U.S. Application Data

[63] Continuation-in-part of Ser. No. 487,309, Apr. 21, 1983, Pat. No. 4,529,268.

[51] Int. Cl.$^4$ .................. G07B 3/08; H04N 5/72
[52] U.S. Cl. .................. 350/276 R; 350/284; 350/452; 358/252; 358/255
[58] Field of Search .......... 350/276 R, 284, 452, 350/389; 358/252, 253, 254, 255

[56] References Cited

U.S. PATENT DOCUMENTS

| | | | |
|---|---|---|---|
| 3,078,343 | 2/1963 | Schulz et al. | 358/252 |
| 3,109,063 | 10/1963 | Parher | 358/252 |
| 3,418,426 | 12/1968 | Schlegel et al. | 358/252 |
| 3,518,373 | 6/1970 | Cushera et al. | 358/252 |
| 4,051,535 | 9/1977 | Inglis | 358/255 |
| 4,391,495 | 7/1983 | Mazurhewitz | 350/452 |

OTHER PUBLICATIONS

Polaroid publication.

*Primary Examiner*—John K. Corbin
*Assistant Examiner*—William Propp
*Attorney, Agent, or Firm*—Cullen, Sloman, Cantor, Grauer, Scott & Rutherford

[57] ABSTRACT

A CRT magnifying lens attachment and glare reduction system for use with a computer display screen. The attachment supports the magnifying lens and glare reduction system adjacent the display screen. The magnifying lens and glare reduction system includes at least on fresnel lens positioned adjacent an optical element, the optical element reduces glare and enhances the image produced by the screen.

5 Claims, 6 Drawing Figures

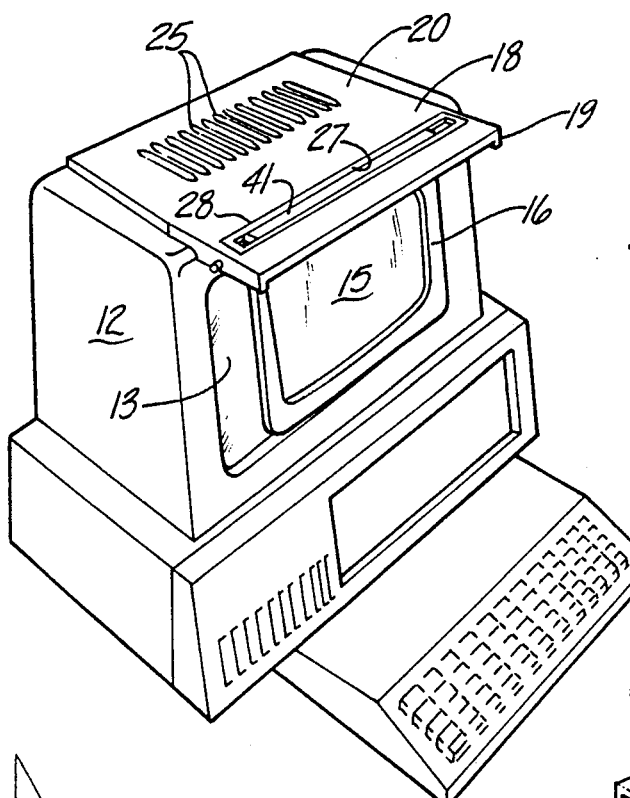
Fig-1
Fig-2
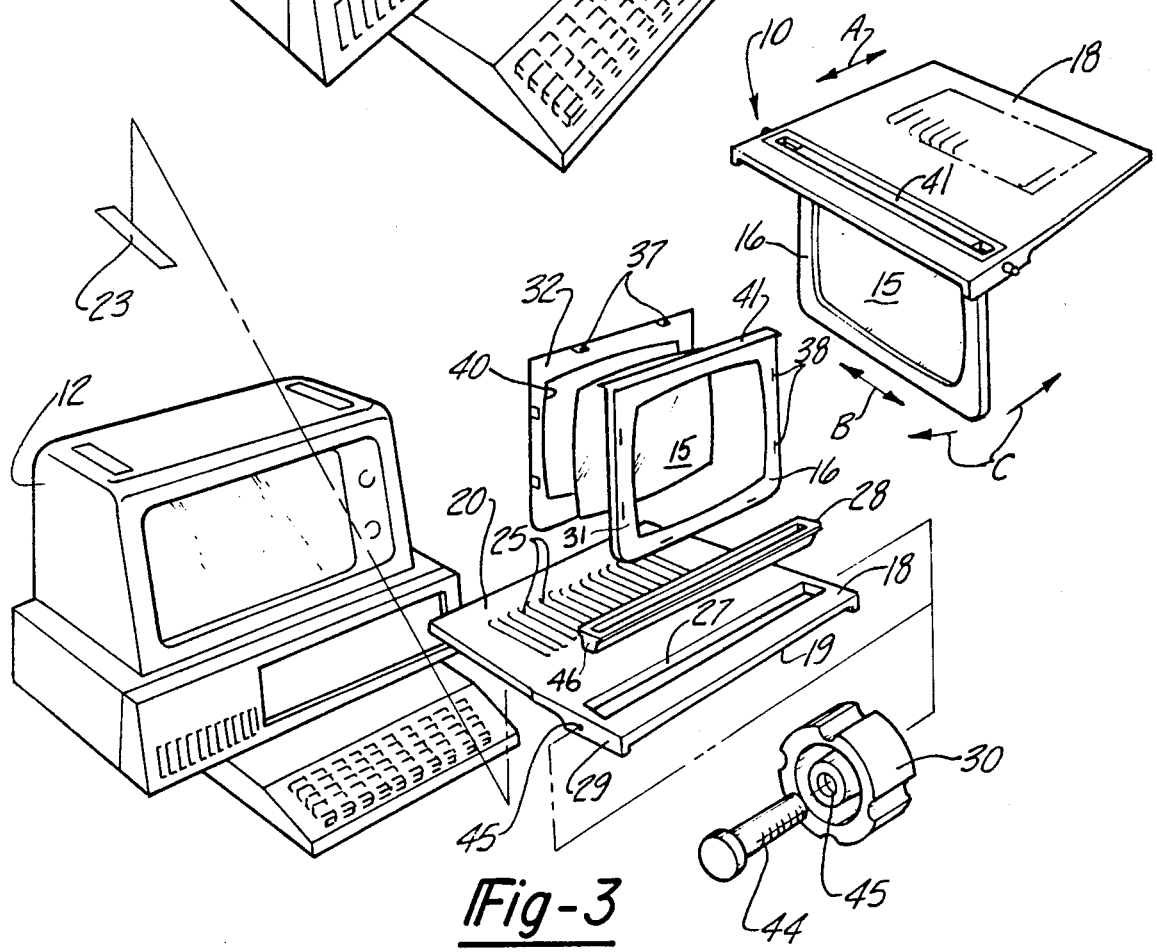
Fig-3

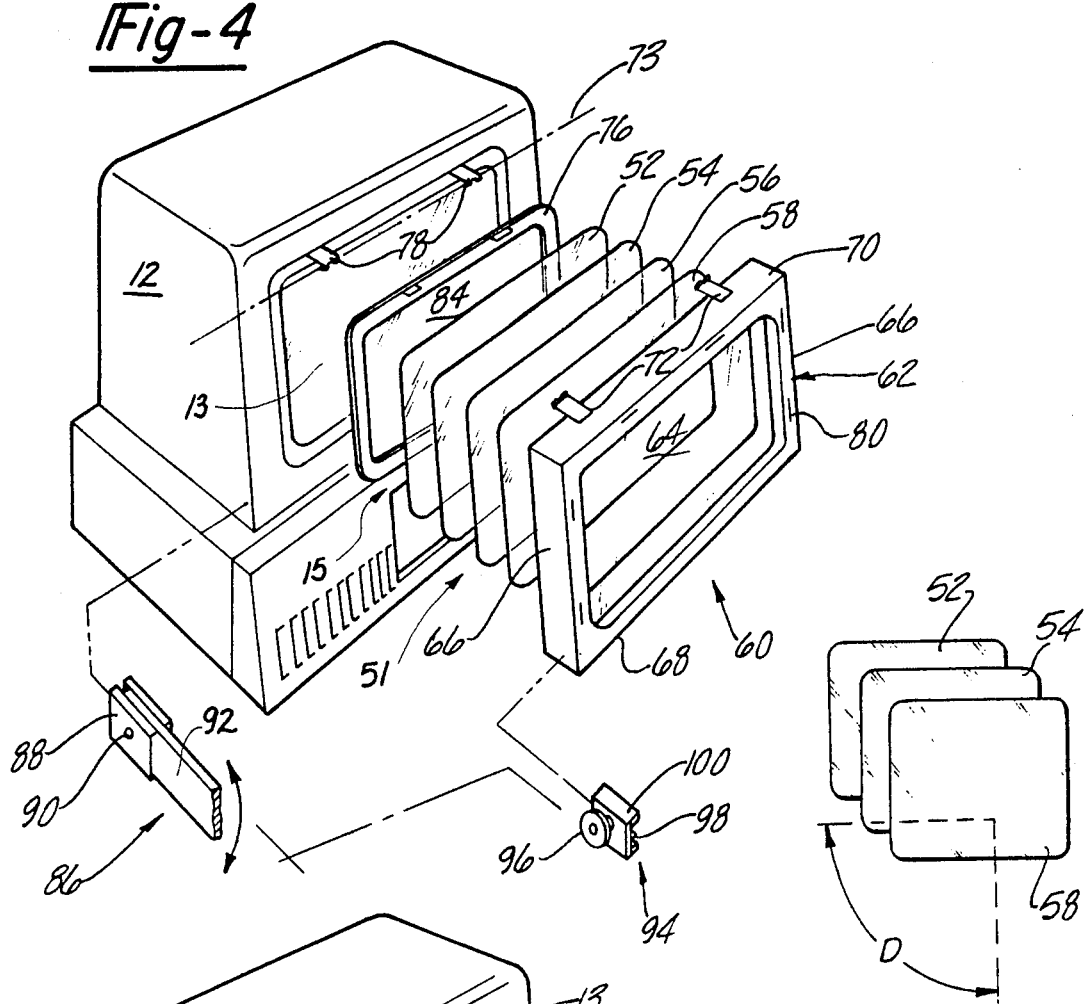
Fig-4
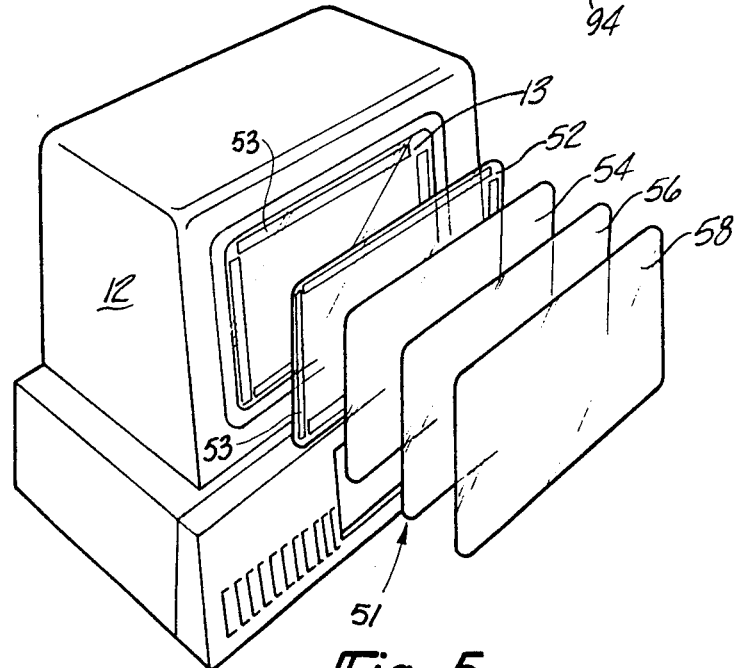
Fig-6
Fig-5

CRT MAGNIFYING LENS ATTACHMENT AND GLARE REDUCTION SYSTEM

BACKGROUND OF THE INVENTION

This is a continuation-in-part of U.S. application Ser. No. 487,309, filed 4/21/83, now U.S. Pat. No. 4,529,268.

Computers frequently feature a visual display unit having a screen upon which information and/or graphics are shown. The screen is most often of the cathode ray tube but may be gas plasma display, an electroluminescent flat screen, a liquid crystal display, or another type of display.

In recent years, the amount of information displayed on CRT screens is continually increasing. To compensate for the increase, it has been necessary to reduce the size of the characters. This is true in part because most screens have a field of only 80 characters wide while most printers have a possible field of 132 characters wide. As manufacturers of display units strive to make characters smaller, the need for magnification of the display is increasing.

In this regard, it is known to attach an optical element to a visual display screen or form an optical element as an integral part of such a screen to increase the size of the image created by the visual display unit. Tinting elements are frequently used to change the color of the light output of the visual display screen, herein after referred to as a screen, for the purpose of reducing eye strain and it is also known to place a fine mesh filter on the front of the screen or apply a coating to the screen to reduce glare.

All of these techniques are known to be used separately, however, no satisfactory combination of the above optical elements has until now been achieved. Therefore, when an optical element for magnification of an image is used the glare is correspondingly magnified with resulting distractions being magnified and when a glare reduction element is used there is no way to magnify the image.

These problems have been overcome by the present invention which realizes other advantages and offers users a choice in optical elements and adjustability in positioning the optical elements that was not previously available.

SUMMARY OF THE INVENTION

The present invention relates to an optical element for reducing glare produced by light reflected by a CRT screen and for magnifying and enhancing the screen projected image.

The optical element has at least one fresnel lens positioned adjacent to the screen to magnifying the image and a laminated filter supported adjacent and parallel to the fresnel lens for reducing glare and enhancing the image.

The laminated filter has three elements: a first element to retard the light passing through it, a second element positioned parallel to and adjacent the first element to vary the color of the image projected from the screen and a third element positioned parallel to and adjacent the first and second elements to capture theretarded light preventing the light from exiting the filter.

The optical element is supported about its periphery by a frame which holds the optical element a spaced distance from the screen. The frame has a front face with an opening therein for viewing the optical element and an edge extending about the periphery of the front face. A pivot means is attached to the top edge pivotally attaching the frame to the unit so that the frame may be adjusted with respect to the screen. In the preferred embodiment the pivot means is a velcro fastener attached to the top of the unit and to the top edge of the frame, the velcro fastener being bendable at its center. Adjustable supports are attached between the frame and the unit so the frame may be retained in selected positions with respect to the screen.

In a second embodiment, the optical element is attached directly to the screen by optically transparent adhesive tape. A further means of attaching the optical element to the screen is by static electricity created by the screen, which retains the element thereon.

The present invention further includes a method for correcting the image produced by a fresnel lens having chromatic aberrations. An imperfect fresnel lens creates a band of colors consisting of reds, greens, and blues with the reds being particularly distracting. The method of correcting the aberrations involves the steps of positioning a one quarter wave retarding element adjacent a fresnel lens. Positioning a linear polarizing element in front of the one quarter-wave retarding element then rotating the linear polarizing element through an arc of approximately 90°, reducing the intensity of the reds by overlapping the reds with the blues.

These and other advantages and objectives will be readily apparent in view of the attached drawings and upon studying the detailed description of the preferred embodiment of the present invention.

BRIEF DESCRIPTION OF THE DRAWINGS

FIG. 1 is a perspective view of a visual display having a retrofit visual display lens holder installed thereon.

FIG. 2 is a perspective view of the retrofit visual display lens holder.

FIG. 3 is an exploded perspective view of the retrofit visual display lens holder and a visual display unit.

FIG. 4 is an exploded perspective view of a second embodiment of the retrofit visual display lens holder and the improved CRT magnifying lens attachment and glare reduction system.

FIG. 5 is an exploded perspective view of the CRT magnifying lens attachment and glare reduction system attachable directly to the CRT screen.

FIG. 6 is an exploded view illustrating a method for improving the image displayed by fresnel lenses having chromatic aberrations.

DETAILED DESCRIPTION OF THE PREFERRED EMBODIMENT

With reference to FIGS. 1 through 3, a first embodiment of the retrofit visual display lens holder 10 of the present invention is shown attached to a microcomputer display unit 12.

Lens holder 10 includes an optical element 15, to be further described below, retained within a frame 16 which is mounted on cantilevered support member 18. Frame 16 is adjustable in several directions: toward or away from, laterally relative to, or tilted angularly with respect to screen 13. Fore and aft adjustment is shown by arrow A, lateral adjustment is shown by arrow B and tilt adjustment is shown by arrow C.

Cantilevered support 18 includes a hood 19 which is disposed generally over and in front of screen 13 which supports lens 15 and frame 16 and shades screen 13 and lens 15 from overhead light. Shading the screen is an important feature with low contrast display such as a liquid crystal display. Support member 18 also includes a mounting portion 20 which is disposed over display unit 12 having a plurality of vents slots 25 to permit adequate ventilation of display unit 12.

An elongated opening 27 is formed in hood 19 to receive a pivotal bracket 28 for retaining frame 16 and securing it to support member 18. Side flanges 29 are provided on opposite sides of hood 19 for reinforcement. Adjustment knobs 30 are provided on opposite sides of pivotal bracket 28, as will be fully described below.

Support member 18 is attached to unit 12 by "Velcro" tabs 23, synthetic materials that adhere when pressed together positioned on the bottom of support member 18 and on the top of unit 12. It will be readily appreciated that the position of support member 18 may be changed relative to display unit 12 by simply disengaging the velcro tabs and repositioning member 18. When support member 18 is moved to a different position the distance between the lens 15 and screen 13 is changed which results in a modification of the magnification power of lens 15.

Frame 16 includes a front panel 31 and a back panel 32 which sandwich the lens or optical element 15 therebetween. Front panel 31 and back panel 32 are secured together by means of perimeter tabs 37, which are formed on back panel 32, and slots 38, formed in front panel 31. Lens 15 is secured between the front and back panels 31 and 32 by locking tabs 37 into slots 38. Frame 16 includes a lens cutout 40 through which the lens 15 is exposed. A T-flange 41 is formed on top of frame 16 to hold frame 16 in the pivotal bracket 28.

Pivotal bracket 28 is secured in the support member by means of screws 44. Screws 44 are secured to adjustment knobs 30 and extend through an enlarged hole 45 formed in each side flange 29. Screws 44 engage threaded holes 46 on opposite sides of pivotal bracket 28 and may be selectively locked in position or turned by the adjustment knobs 30; wherein loosening the adjustment knobs 30 permits pivotal bracket 28 to tilt relative to support member 18 and screen 13.

When lens 15 is in its desired position, adjustment knobs 30 may be tightened locking lens 15 in place by frictional force exerted by adjustment knobs 30 on the outside of side flanges 29. If the user wishes to view screen 13 without lens 15 it is a simple matter to remove frame 16 from bracket 28.

Pivotal bracket 28 is preferably longer than the length of frame 16 so that lens 15 may be moved in the direction of arrow B parallel to the face of screen 13. In this way lens 15 may be directed toward one portion of screen 13 depending upon the need to concentrate on only one part of screen 13.

Referring now to FIG. 4, the preferred embodiment of optical element 15 will be described as well as a second embodiment of the frame for supporting the optical element 15. Optical element 15 includes a fresnel lens 52 and laminated element 51. Element 51 has a one quarter-wave retarding element 54, a color polarizing element 56 and a linear polarizing filter 58. Laminated element 51 receives light which passes through the linearly polarizing filter 58 wherein it is linearly polarized at 45 degrees to the respective axis of the one quarter wave retarding lens 54. The action of the linearly polarized light ray upon entering and passing through the one quarter-wave retarder 54 may be described as the passage of two equal but oppositely polarized components one retarded with respect to the other by a one quarter of a wave length. This combination results in a circularly polarized light ray of either left or right hand rotation.

When the circular polarized light ray is reflected from surface 13, the sense of rotation reverses with the reflection of the ray. The change in both direction and sense of rotation of the light ray results, on re-entry through the quarter-wave component, in an additional quarter-wave phase shift. The total change in phase of the light ray entering and exiting the quarter-wave component is therefore, one-half of a wave length which transforms the circularly polarized ray back into a light ray that is linearly polarized in a plane 90° to its original entrance plane. Thus, the back reflected light is absorbed by the linearly polarized component 58.

The color polarizing element 56 varies the color of the image, therein enhancing the image produced by screen 13. The element 56 confines light rays in selected directions eminating from screen 13 allowing only certain rays to pass.

The laminated optical element 51 is secured within the second embodiment of support frame 60. Frame 60 has a front face 62 with an opening 64 therein to permit viewing of element 51, side edges 66 extending perpendicularly to and rearwardly from front face 62 and bottom and top edges 68 and 70 respectively. Attached between the top edge 70 and the ledge or front face 74 of the unit is hinge 72, which is for example made of "Velcro". Hinge 72 permits frame 60 to pivot with respect to the unit about the center line 73 of hinge 72.

A back panel 76 secures element 51 to frame 60 by tabs 78 which are received in slots 80 in the front face 62 of frame 60. Back panel 76 has an opening 84 to permit viewing of screen 13.

An adjustable support 86 is provided for locking frame 60 in position. In the preferred embodiment, support 86 is comprised of a pivotal adjustment arm 92 interconnecting frame 60 with unit 12, arm 92 being lockable by a locking device 94. Arm 92 is pivotally connected to the side of unit 12 by pivotal mounting plates 88 and pivot pin 90. Locking device 94 has a set screw 98 which is received by arm 92 to lock arm 92 in position. Flanges 100 guide arm 92.

With reference to FIG. 5 a third embodiment of the magnifying lens attachment and glare reduction system of the present invention is illustrated. The third embodiment includes laminated element 51 attached to the fresnel lens 52 by means of two-sided adhesive optical tape, 53, Fresnel lens 52 is then attached to screen 13 by two-sided optical adhesive tape 53. As is readily apparent, the third embodiment is much cheaper to produce but does not provide the added benefit of adjustability. A third embodiment provides for attachment by means of static electricity produced by screen 13.

With reference to FIG. 6, a method for correcting the image produced by a fresnel lens that has chromatic aberrations therein is illustrated. An imperfect fresnel lens creates a distracting band of colors consisting of reds, greens, and blues; with the red colors being the most distracting to a person viewing the screen. As illustrated in FIG. 6, the distracting reds may be corrected by first affixing a one quarter wave retarding element 54 to the fresnel lens 52, the positioning a linear polarizing filter 58 adjacent the one quarter wave retarding element 54. To correct the reds the linear polarizing element is rotated through an arc of substantially 45°; the arc of rotation is shown at D. This rotation causes the reds and blues to overlap.

The embodiments of the present invention are presented as an example not by way of limitation and the scope of the invention should be measured by reference to the following claims.

What is claimed is:

1. An optical element for magnifying and enhancing the image projected from a screen and for reducing glare produced by light generated externally of said screen and reflected from said screen, comprising:
   at least one fresnel lens supported adjacent said screen for magnifying the image generated by said screen;
   a laminated light filter supported adjacent and parallel to said fresnel lens for reducing said glare and for enhancing said image;
   said laminated light filter having a first element to retard said light generated externally and passing therethrough;
   a second element positioned parallel to and adjacent said first element to vary the color of the image projected from said screen; and
   a third element positioned parallel to and adjacent said first and second element to capture said retarded light preventing said light from exiting said filter;
   whereby said glare is reduced and said images magnified and enhanced.

2. The optical element of claim 1, further comprising a frame attached about the periphery of said optical element for holding said optical element spaced from said visual display screen,
   said frame having a front face with an opening therein for viewing said optical element and a peripheral edge extending perpendicular to and rearwardly from said front face,
   a pivot means attached to said edge pivotally attaching said frame to said unit whereby said frame may be adjusted with respect to said screen about a horizontal axis extending through the center line of said pivot means, and adjustable supports attached between said frame and said unit whereby said frame may be retained in a selected position with respect to said screen.

3. The optical element of claim 2, wherein said pivot means comprises a velcro fastener.

4. The optical element of claim 1, wherein said element is attached by attaching means directly to said screen, said attaching means comprising two faced optical adhesive tape.

5. A method for correcting the image produced by a fresnel lens having chromatic aberrations therein, said chromatic aberrations creating a band of colors consisting of reds, greens, and blues said reds being distracting to a person viewing said screen, comprising the steps of:
   affixing a one quarter wave retarding element to a fresnel lens;
   affixing a linearly polarizing element to said one quarter wave retarding element;
   rotating said linear polarizing element 45 degrees with respect to said retarding element overlapping said red and blue bands of color.

* * * * *